(12) United States Patent
Lai et al.

(10) Patent No.: US 9,778,880 B2
(45) Date of Patent: Oct. 3, 2017

(54) MEMORY CONTROL CIRCUIT UNIT, DATA TRANSMITTING METHOD AND MEMORY STORAGE DEVICE

(71) Applicant: PHISON ELECTRONICS CORP., Miaoli (TW)

(72) Inventors: Ming-Fu Lai, Miaoli (TW); Rui-Chang Huang, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 180 days.

(21) Appl. No.: 14/965,914

(22) Filed: Dec. 11, 2015

(65) Prior Publication Data
US 2017/0109097 A1   Apr. 20, 2017

(30) Foreign Application Priority Data
Oct. 19, 2015   (TW) .............................. 104134263 A

(51) Int. Cl.
*G06F 12/00*     (2006.01)
*G06F 3/06*      (2006.01)
*G06F 13/40*     (2006.01)

(52) U.S. Cl.
CPC .......... *G06F 3/0659* (2013.01); *G06F 3/0604* (2013.01); *G06F 3/0629* (2013.01); *G06F 3/0679* (2013.01); *G06F 13/4068* (2013.01)

(58) Field of Classification Search
None
See application file for complete search history.

(56) References Cited

U.S. PATENT DOCUMENTS 6,445,207 B1 * 9/2002 Kamimura ....... G01R 31/31937
324/762.02
9,563,381 B2 * 2/2017 Gordon ................. G06F 3/0629

* cited by examiner

Primary Examiner — Baboucarr Faal
(74) Attorney, Agent, or Firm — Jianq Chyun IP Office

(57) ABSTRACT

A memory control circuit unit, a memory storage device and a data transmitting method are provided. The memory storage device coupled to a first host system includes a reset pin. The memory control circuit unit of the memory storage device includes a pulse pattern detector. The reset pin is coupled to a second host system and is configured to receive a first pulse signal from the second host system. The pulse pattern detector is coupled to the reset pin, and is configured to determine whether the first pulse signal is conformed to a first predetermined serial pulse pattern or not. If the first pulse signal is conformed to the first predetermined serial pulse pattern, the memory control circuit unit is configured to disable a reset function of the memory storage device.

21 Claims, 10 Drawing Sheets

MEMORY CONTROL CIRCUIT UNIT, DATA TRANSMITTING METHOD AND MEMORY STORAGE DEVICE

CROSS-REFERENCE TO RELATED APPLICATION

This application claims the priority benefit of Taiwan application serial no. 104134263, filed on Oct. 19, 2015. The entirety of the above-mentioned patent application is hereby incorporated by reference herein and made a part of this specification.

BACKGROUND

1. Technical Field

The present invention relates to a data transmitting method, and more particularly, to a data transmitting method, a memory control circuit unit and a memory storage device.

2. Description of Related Art

The growth of digital cameras, mobile phones, and MP3 players has been rapid in recent years. Consequently, the consumers' demand for storage media has increased tremendously. Since the rewritable non-volatile memory is notable for its properties of data non-volatility, low power consumption, compact size, non-mechanical structure, and fast read/write speed, the rewritable non-volatile memory is suitable for these electronic products. Therefore, flash memory has recently become an important part of the electronic industries. For example, the embedded multimedia card (eMMC) broadly used in mobile electronic devices is a storage device using flash memory as storage medium.

Generally speaking, in the mass production process of the electronic devices (e.g., mobile phones, tablet computers, and navigators) having the eMMCs, the eMMCs burnt with data (e.g., firmware codes, operating systems, etc.,) are soldered to the circuit boards of the electronic devices through a high temperature tin furnace process. Particularly, in the flash memory module, data are identified based on the charges stored in the memory cells. Thus, if the electronic products are found to have an anomaly and require a debug analysis on the eMMCs thereof, the charges stored in the memory cells may be affected (e.g., current leakage) in multiple high temperature soldering and desoldering process performed to the eMMCs, making data stored in the eMMCs erroneous or lost, because the eMMCs are already soldered to the circuit boards of the electronic products. Thus, the anomaly of the electronic products cannot be correctly determined.

Besides, some anomalies of the eMMCs can only be found if the eMMCs are soldered to the electronic products. However, under the circumstance that the eMMCs are soldered to the circuit boards of the electronic products, the important information of the eMMCs inside the electronic product is not accessible outside the electronic products, and parameters are unable to be written to make correction, either. Thus, how to perform a debug analysis to the electronic device having the eMMC to correctly determine the issue that results in the anomaly of the electronic product, so as to effectively improve a debug efficiency of the electronic products is still an issue to work on.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory control circuit unit, a memory storage device, and a data transmitting method capable of effectively improving a debug efficiency of an embedded storage device soldered to an electronic device.

According to an exemplary embodiment of the present invention, a memory control circuit unit for controlling a memory storage device is provided. The memory control circuit unit includes a host interface, a memory interface, a memory management circuit, and a pulse pattern detecting circuit. The host interface is coupled to a first host system, the memory interface is coupled to a rewritable non-volatile memory module, and the memory management circuit is coupled to the host interface and the memory interface. The memory storage device includes a reset pin, and the reset pin is coupled to the memory control circuit unit and the pulse pattern detecting circuit. The reset pin receives a first pulse signal from a second host system, and the pulse pattern detecting circuit is configured to determine whether a first serial pulse pattern of the first pulse signal is conformed to a first predetermined serial pulse pattern. If the first serial pulse pattern is conformed to the first predetermined pulse pattern, the memory management circuit is further configured to disable a reset function of the memory storage device.

According to an exemplary embodiment of the invention, a memory storage device, including a connecting interface unit, a rewritable non-volatile memory module, a memory control circuit unit, and a reset pin is provided. The connecting interface unit is coupled to a first host system. The memory control circuit unit is coupled to the connecting interface unit and the rewritable non-volatile memory module. The reset pin is coupled to the connecting interface unit and the memory control circuit unit, and the memory control circuit unit includes a pulse pattern detecting circuit. The reset pin receives a first pulse signal from a second host system. The pulse pattern detecting circuit is coupled to the reset pin and configured to determine whether a first serial pulse pattern of the first pulse signal is conformed to a first predetermined serial pulse pattern. If the first serial pulse pattern is conformed to the first predetermined pulse pattern, the memory control circuit unit is further configured to disable a reset function of the memory storage device.

According to an exemplary embodiment of the present invention, a data transmitting method for a memory storage device is provided, and the memory storage device is coupled to a first host system. The data transmitting method includes: receiving a first pulse signal from a second host system through a reset pin of the memory storage device, determining, by a pulse pattern detecting circuit of the memory storage device, whether a first serial pulse pattern of the first pulse signal is conformed to a first predetermined serial pulse pattern, and disabling a reset function of the memory storage device if the first serial pulse pattern is conformed to the first predetermined serial pulse pattern.

Based on above, the embodiments of the present invention disable the reset function to an embedded storage device through the reset pin by comparing the pulse pattern of the pulse signal and enable the access operation to the embedded storage device through the reset pin. Thus, a debug analysis may be performed to an electronic device having the embedded storage device without desoldering the embedded storage device. Consequently, errors or loss of data in the embedded storage device may be prevented, and the debug efficiency is effectively improved.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1:
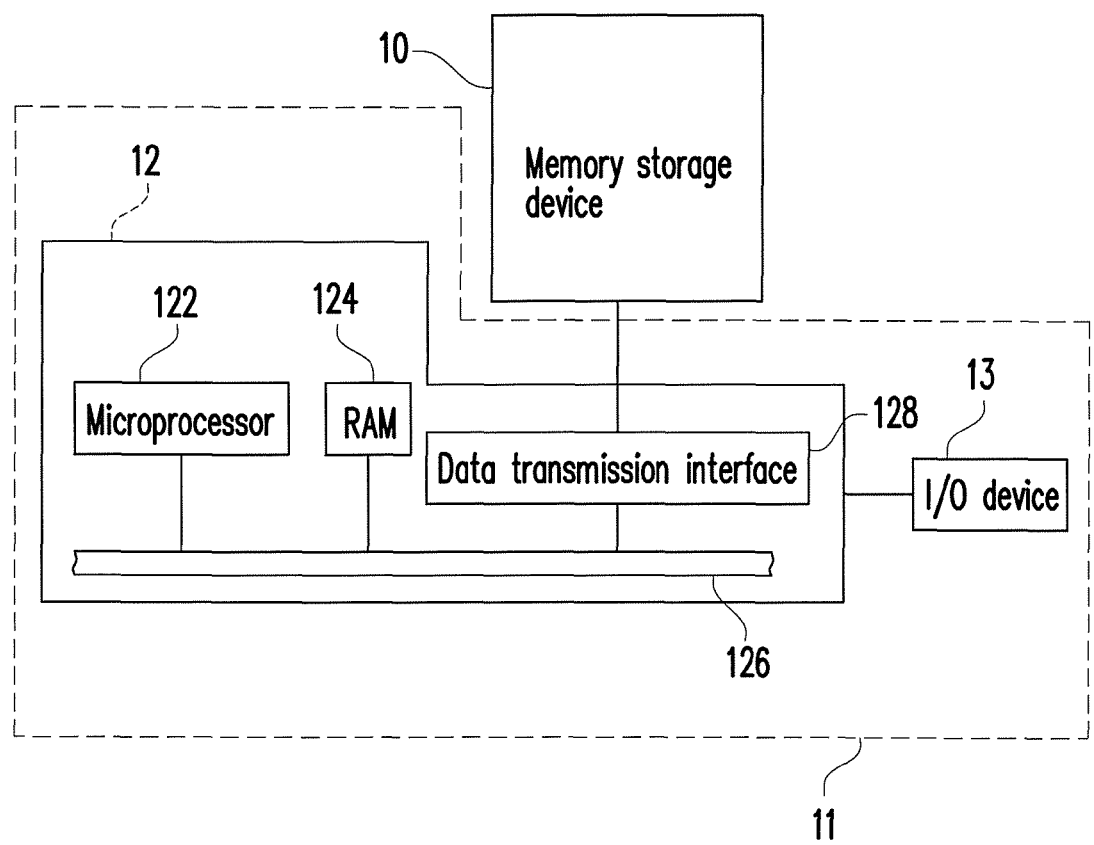
FIG. 1 is a schematic diagram illustrating a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually used together with a host system, such that the host system can write data into or read data from the memory storage device.

Figure 2:
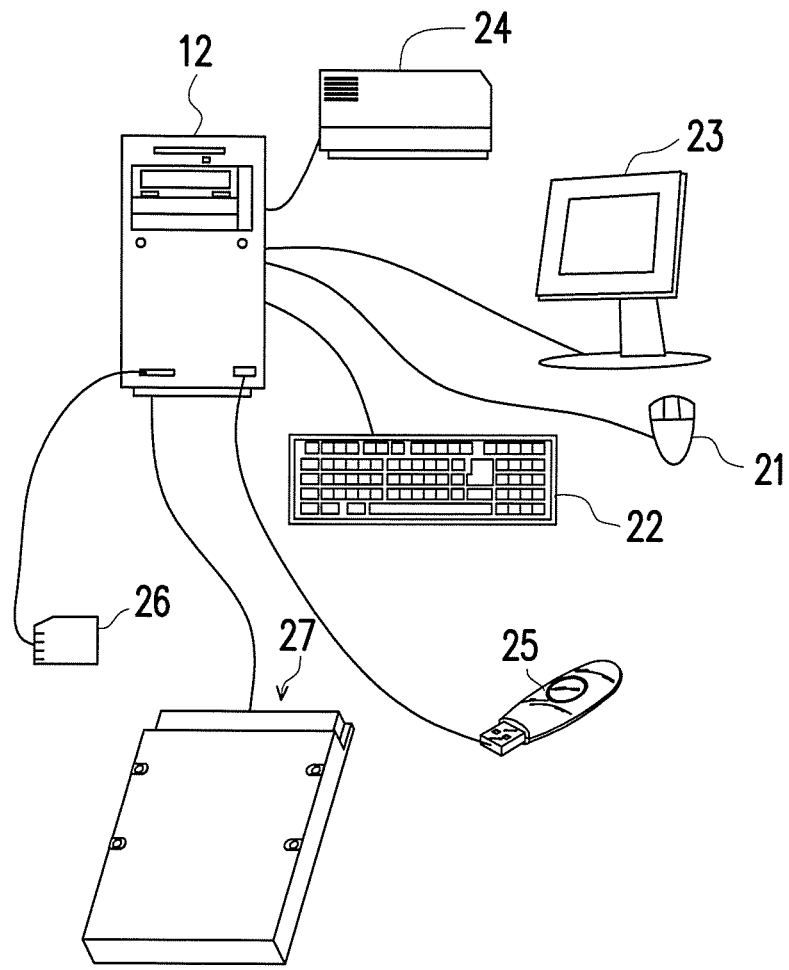
FIG. 2 is a schematic diagram illustrating a computer, an input/output device, and a memory storage device according to an exemplary embodiment.

FIG. 1 is a schematic diagram illustrating a host system and a memory storage device according to an exemplary embodiment, and FIG. 2 is a schematic diagram illustrating a computer, an input/output device, and a memory storage device according to an exemplary embodiment.

Referring to FIG. 1, a host system 11 includes a computer 12 and an input/output (I/O) device 13. The computer 12 includes a microprocessor 122, a random access memory (RAM) 124, a system bus 126, and a data transmitting interface 128. The I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In this embodiment, the memory storage device 10 is electrically connected to other components of the host system 11 through the data transmitting interface 128. By using the microprocessor 122, the random access memory (RAM) 124 and the I/O device 13, data can be written into or read from the memory storage device 10. For instance, the memory storage device 10 may be a rewritable non-volatile memory storage device, such as a flash drive 25, a memory card 26, or a solid state drive (SSD) 27, as shown in FIG. 2.

Figure 3:
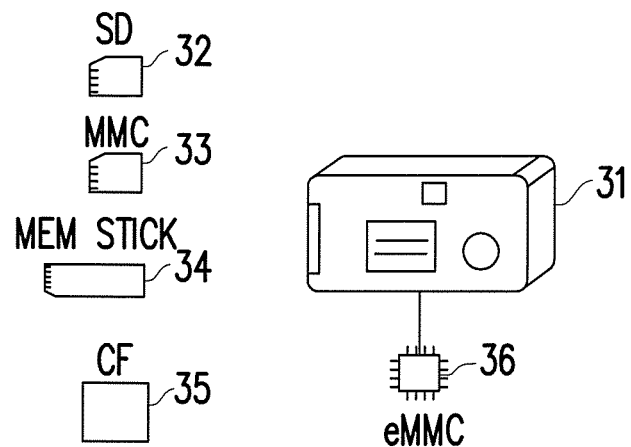
FIG. 3 is a schematic diagram illustrating a host system and a memory storage device according to an exemplary embodiment.

FIG. 3 is a schematic diagram illustrating a host system and a memory storage device according to an exemplary embodiment.

Generally, the host system 11 may substantially be any system capable of storing data with the memory storage device 10. Even though the host system 11 is illustrated as a computer system in the exemplary embodiment, the host system 11 may be a system such as a digital camera, a video camera, a telecommunication device, an audio player, or a video player, etc., in another exemplary embodiment. For example, if the host system is a digital camera (video camera) 31 shown in FIG. 3, the rewritable non-volatile memory storage device may be a secure digital (SD) card 32, a multimedia card (MMC) 33, a memory stick 34, a compact flash (CF) card 35 or an embedded storage device 36 (as shown in FIG. 3). The embedded storage device 36 includes an embedded multimedia card (eMMC). It should be mentioned that the eMMC is directly electrically connected to a substrate of the host system.

Figure 4:
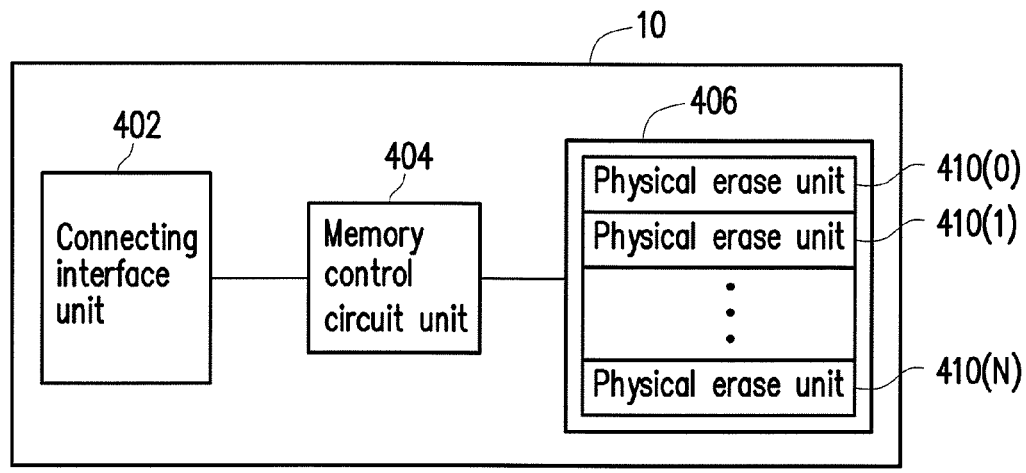
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connecting interface unit 402, a memory control circuit unit 404, and a rewritable non-volatile memory module 406.

In this exemplary embodiment, the connecting interface unit 402 is compatible with the embedded multimedia card (eMMC) interface standard. However, the present invention is not limited thereto, and the connecting interface unit 402 may also be compatible with the parallel advanced technology attachment (PATA) standard, the Institute of Electrical and Electronic Engineers (IEEE) 1394 standard, the peripheral component interconnect express (PCI Express) standard, the universal flash storage (UFS) standard, the ultra high speed-I (UHS-I) interface standard, the ultra high speed-II (UHS-II) interface standard, the secure digital (SD) interface standard, the memory stick (MS) interface standard, the serial advanced technology attachment (SATA) standard, the compact flash (CF) interface standard, the integrated device electronics (IDE) standard, or other suitable standards. In this exemplary embodiment, the connecting interface unit may be packaged with the memory control circuit unit within a chip, or be disposed outside a chip including the memory control circuit unit.

The memory control circuit unit 404 is configured for executing a plurality of logic gates or control instructions implemented in a hardware form or in a firmware form, and performing various data operations, such as data writing, data reading or data erasing in the rewritable non-volatile memory module 406 according to the commands of the host system 11.

The rewritable non-volatile memory module 406 is coupled to the memory control switch unit 404 and stores the data written by the host system 11. The rewritable non-volatile memory module 406 has physical erasing units 410(0) to 410(N). For example, the physical erasing units 410(0) to 410(N) may belong to the same memory die or different memory dies. Each of the physical erasing units has a plurality of physical programming units, and the physical programming units of the same physical erasing unit may be written separately and erased simultaneously. However, it should be understood that the present invention is not limited thereto. Each physical erasing unit is composed by 64 physical programming units, 256 physical programming units or any amount of the physical programming units.

More specifically, the physical erasing unit is a minimum unit for erasing. In other words, each of the physical erasing units includes the minimum number of memory cells that are erased together. The physical programming unit is the minimum unit for programming. In other words, the physical programming unit is the minimum unit for writing data. Each of the physical programming units usually includes a data bit area and a redundant bit area. The data bit area includes a plurality of physical access addresses to store user data, and the redundant bit area stores system data (e.g., control information and error correcting code). In this exemplary embodiment, the data bit area of each of the physical programming units includes 8 physical access addresses, and the size of each physical access address is 512 bytes. However, in other exemplary embodiments, the data bit area may also include more or fewer physical access addresses, and the present invention does not intend to limit the size and number of the physical access addresses. For example, in an exemplary embodiment, the physical erasing unit is a physical block, and the physical programming unit is a physical page or a physical sector. However, the present invention is not limited thereto.

In this exemplary embodiment, the rewritable non-volatile memory module 406 is a multi-level cell (MLC) NAND flash memory module (i.e., a flash memory module capable of storing two data bits in one memory cell). However, the present invention is not limited thereto. The rewritable non-volatile memory module 406 may also be a single level cell (SLC) NAND flash memory module (i.e., a flash memory module capable of storing one data bit in one memory cell), a trinary level cell (TLC) NAND flash memory module (i.e., a flash memory module capable of storing three data bits in one memory cell), other flash memory modules, or other memory modules having the same properties.

Figure 5:
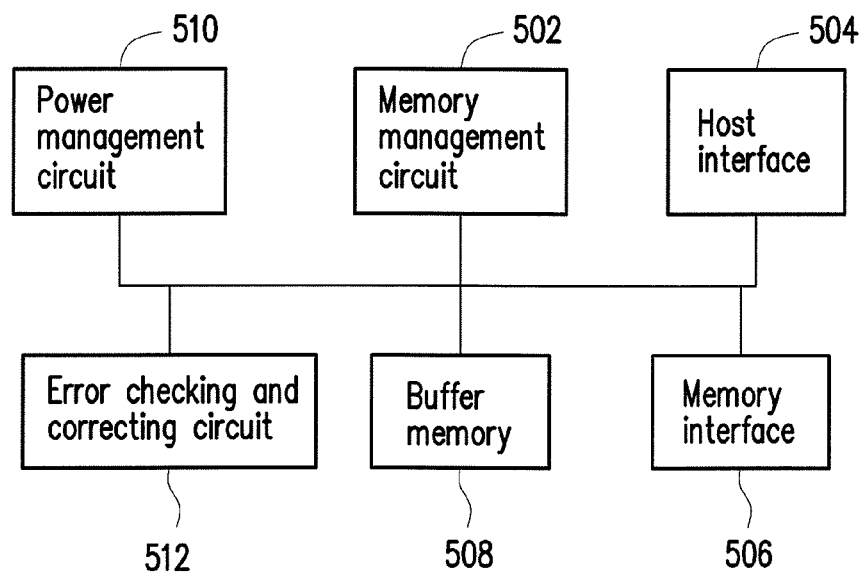
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, and a memory interface 506.

The memory management circuit 502 controls the overall operation of the memory control circuit unit 404. Specifically, the memory management circuit 502 has a plurality of control instructions. If the memory storage device 10 is operated, the control instructions are executed to perform various data operations such as data writing, data reading and data erasing.

In this exemplary embodiment, the control instructions of the memory control circuit unit 502 are implemented in a firmware form. For instance, the memory management circuit 502 has a microprocessor (not shown) and a read-only memory (not shown), and the control instructions are burnt into the read-only memory. If the memory storage device 10 is operated, the control instructions are executed by the microprocessor for various data operations, such as data writing, data reading or data erasing.

In another exemplary embodiment of the present invention, the control instructions of the memory management circuit 502 may also be stored in a specific area (for example, the system area in the memory module exclusively used for storing system data) of the rewritable non-volatile memory module 406 as program codes. Moreover, the memory management circuit 502 has a microprocessor unit (not shown), a read-only memory (not shown), and a random access memory (not shown). Specifically, the read-only memory has a boot code. If the memory control circuit unit 404 is enabled, the boot code is firstly executed by the microprocessor unit for loading the control instructions stored in the rewritable non-volatile memory module 406 into the random access memory of the memory management circuit 502. Afterwards, the microprocessor unit executes the control instructions for various data operations such as data writing, data reading and data erasing.

The host interface 504 is coupled to the memory management circuit 502 and couples the connecting interface unit 402, so as to receive and identify commands and data sent by the host system 11. Namely, the commands and data sent by the host system 11 are transmitted to the memory management circuit 502 through the host interface 504. In this exemplary embodiment, the host interface 504 is compatible with the eMMC standard. However, it should be understood that the present invention is not limited thereto. The host interface 504 may also be compatible with the PATA standard, the IEEE 1394 standard, the PCI Express standard, the UFS standard, the UHS-I interface standard, the UHS-II interface standard, the SD standard, the MS standard, the SATA standard, the CF standard, the IDE standard, or other suitable data transmitting standards.

The memory interface 506 is coupled to the memory management circuit 502 and accesses the rewritable non-volatile memory module 406. In other words, data to be written to the rewritable non-volatile memory module 406 are converted into a format acceptable to the rewritable non-volatile memory module 406 through the memory interface 506.

In an exemplary embodiment, the memory control circuit unit 404 further includes a buffer memory 508, a power management circuit 510, and an error checking and correcting circuit 512.

The buffer memory 508 is coupled to the memory management circuit 502 and configured for temporarily storing data and commands from the host system 11 or data from the rewritable non-volatile memory module 406.

The power management circuit 510 is coupled to the memory management circuit 502 and controls the power of the of the memory storage device 10.

The error checking and correcting circuit 512 is coupled to the memory management circuit 502 and executes an error checking and correcting procedure to ensure the accuracy of data. More specifically, if the memory management circuit 502 receives a write command from the host system 11, the error checking and correcting circuit 512 may generate an error checking and correcting (ECC) code for data corresponding to the write command. In addition, the memory management circuit 502 may write the data corresponding to the write command and the corresponding error checking and correcting code to the rewritable non-volatile memory module 406. Subsequently, if the memory management circuit 502 reads the data from the rewritable non-volatile memory module 406, the error checking and correcting code corresponding to the data is also read, and the error checking and correcting circuit 512 executes the error checking and correcting procedure for the read data based on the error checking and correcting code.

Figure 6:
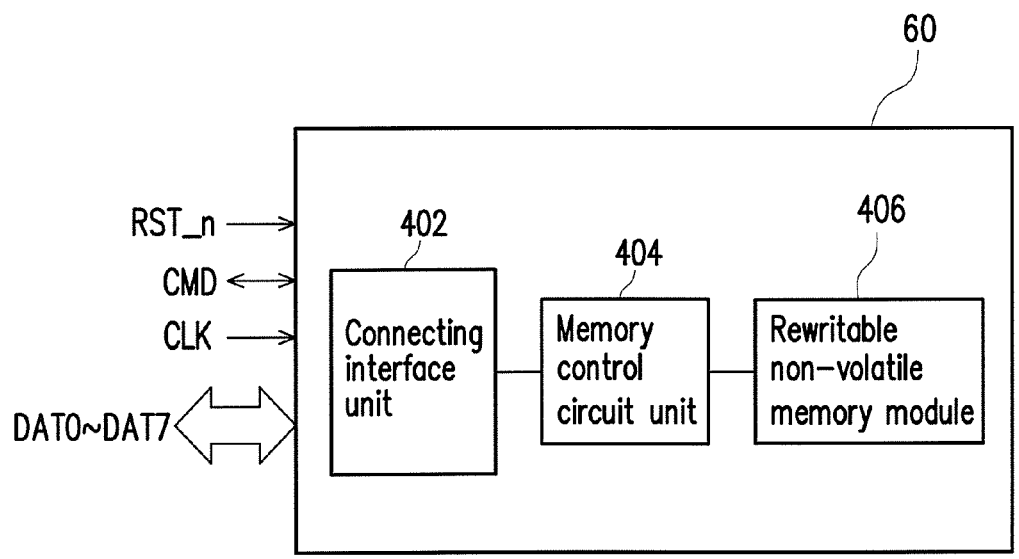
FIG. 6 is a schematic block diagram illustrating an embedded storage device according to an exemplary embodiment.
Figure 7:
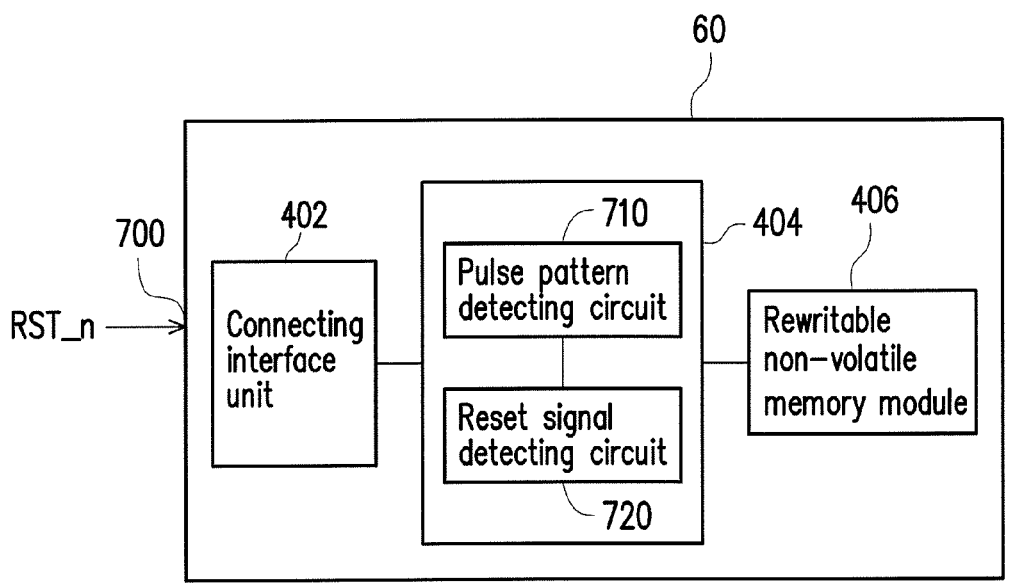
FIG. 7 is a schematic block diagram illustrating an embedded storage device according to another exemplary embodiment of the present invention.

FIG. 6 is a schematic block diagram illustrating an embedded storage device according to an exemplary embodiment. FIG. 7 is a schematic block diagram illustrating an embedded storage device according to another exemplary embodiment of the present invention.

Referring to FIG. 6, in the exemplary embodiment of the present invention, the rewritable non-volatile memory device 10 is an embedded storage device used in an electronic device, such as an embedded multimedia card 60. Specifically, the embedded multimedia card 60 includes a plurality of input/output (I/O) pins, and the I/O pins are usually disposed at the back surface of the multimedia card 60. The main I/O pins include a command pin CMD, a clock pin CLK, a first data pin DAT0 to an eighth data pin DAT7, and a reset pin RST_n. The command pin CMD mainly transmits a command compatible with a multimedia card protocol, the clock pin CLK transmits a clock signal, the data pins DAT0 to DAT7 transmit data signals, and the reset pin RST_n receives a reset signal. For example, after the memory control circuit unit 404 receives the reset signal from the host system 11 through the reset pin RST_n, the memory control circuit unit 404 may execute a hardware reset operation to reset the embedded multimedia card and then be provided with power again to be restarted. In addition, the memory control circuit 404 communicates with an external device through the I/O pins of the embedded multimedia card 60 by using the multimedia card protocol. For example, by transmitting a corresponding command through the command pin CMD, operations such as data transmission and setting of the embedded multimedia card may be executed.

Referring to FIG. 7, in the exemplary embodiment, the embedded multimedia card 60 includes a reset pin 700, a pulse pattern detecting circuit 710, and a reset signal detecting circuit 720. The pulse pattern detecting circuit 710 is coupled to the reset pin 700 to determine whether a serial pulse pattern of a pulse signal received by the reset pin 700 is conformed to a predetermined serial pulse pattern (also referred to as first predetermined serial pulse pattern). If the received first serial pulse pattern is conformed to the first predetermined serial pulse pattern, the memory control circuit unit 404 disables a reset function to the embedded multimedia card 60 through the reset pin 700. The reset signal detecting circuit 720 determines whether the pulse signal received by the reset pin 700 is a reset signal, so as to determine whether to execute the hardware reset operation to the embedded multimedia card 60. To more clearly illustrate the operation of the control circuit and the pulse pattern detecting circuit thereof according to the exemplary embodiment of the present invention, an example is described in the following with reference to FIG. 8, FIG. 9A to FIG. 9B, and FIG. 10.

Figure 8:
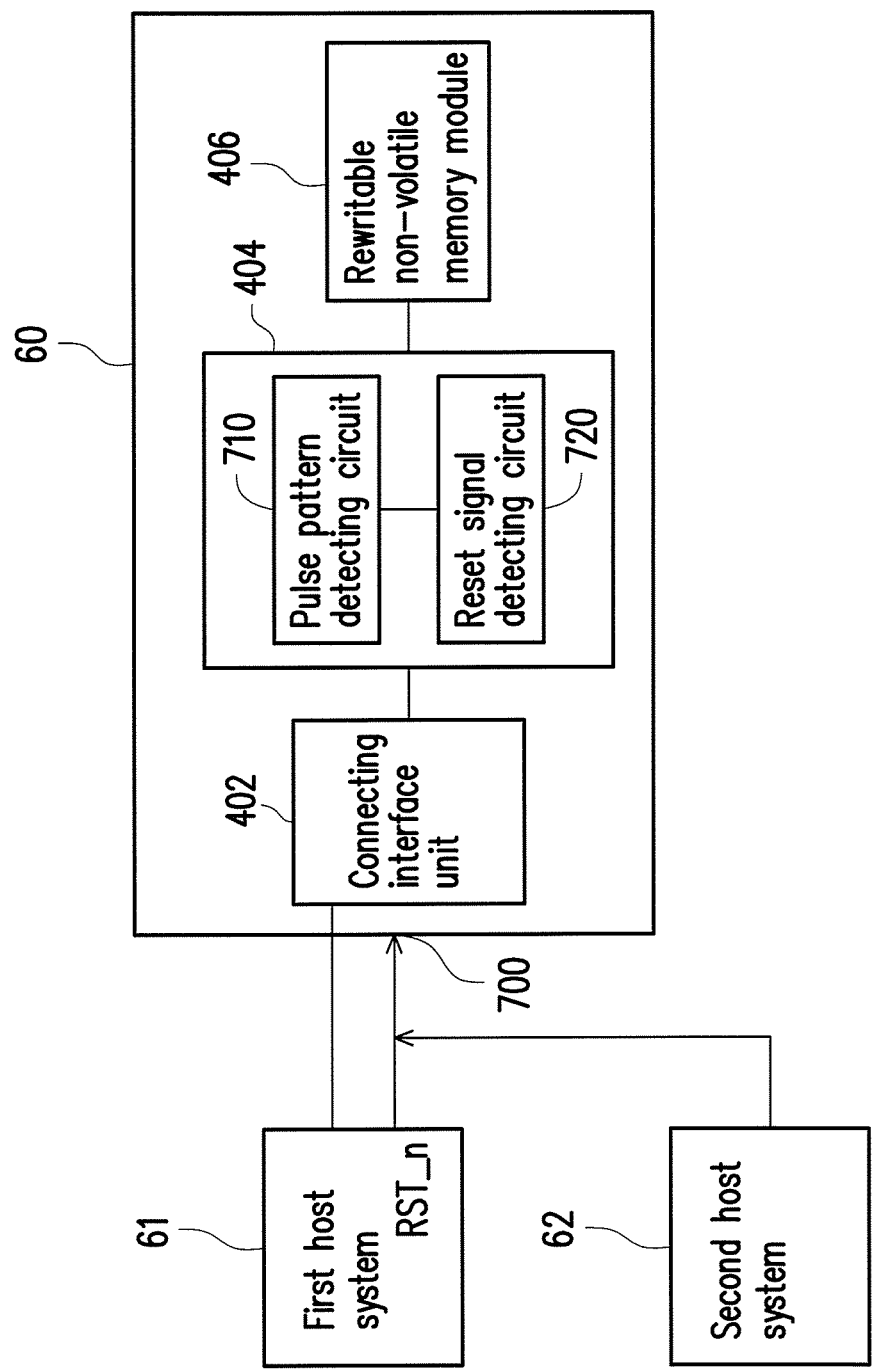
FIG. 8 is an exemplary schematic diagram illustrating operation of a host system and a memory control circuit unit according to an exemplary embodiment of the present invention.

FIG. 8 is an exemplary schematic diagram illustrating operation of a host system and a memory control circuit unit according to an exemplary embodiment of the present invention.

Referring to FIG. 8, the embedded multimedia card 60 may be soldered to an electronic device of any kind, such as a mobile communication device, a tablet computer, a digital camera, a video camera, an audio player, or a video player, and may be coupled to a host system 61 (also referred to as first host system 61) of the electronic device that the embedded multimedia card 60 is soldered to. Specifically, if performing a debugging analysis to the electronic device that the embedded multimedia card 60 is soldered to, in order to prevent multiple desoldering and resoldering processes to the embedded multimedia card 60 soldered to the electronic device during the debugging process, the reset pin 700 of the embedded multimedia card 60 is coupled to another host system 62 (also referred to as second host system 62) in the exemplary embodiment of the present invention, so as to perform the debugging analysis to the embedded multimedia card 60 by using the second host system 62 without desoldering the embedded multimedia card 60. The present invention does not intend to limit the type of the second host system 62. For example, the second host system 62 may be a device capable of performing a debugging analysis to the embedded multimedia card 60, such as a control circuit board, a laptop computer, a desktop computer, a personal digital assistant, or a mobile device.

In this exemplary embodiment, if the pulse signal (also referred to as the first pulse signal) is received from the second host system 62 through the reset pin 700, the pulse pattern detecting circuit 710 may further determine whether the pulse pattern (also referred to as first serial pulse pattern) of the first pulse signal is conformed to the first predetermined serial pulse pattern. In addition, after the pulse pattern detecting circuit 710 determines that the first serial pulse pattern of the first pulse pattern is conformed to the first predetermined serial pulse pattern, the memory control circuit 404 disables the reset function to the embedded multimedia card 60 through the reset pin 700. The reset function is triggered if the reset signal detecting circuit 720 detects the reset signal (also referred to as second pulse signal) received by the reset pin 700 from the first host system 61. For example, if the reset signal detecting circuit 720 detects the second pulse signal, the reset operation is performed based on triggering of the memory control circuit unit 404 by the second pulse signal. Thus, in a process that the memory control circuit unit 404 disables the reset function to the embedded multimedia card 60 through the reset pin, the memory control circuit unit 404 temporarily disables the reset signal detecting circuit 720. For example, the pulse pattern detecting circuit 710 temporarily disables the operation of the reset signal detecting circuit 720 after the reset pin receives a pulse signal from the second host system 62, and then determines whether the pulse pattern of the received pulse signal is conformed to the first predetermined serial pulse pattern.

Then, after the pulse pattern detecting circuit 710 determines that the first serial pulse pattern is conformed to the first predetermined serial pulse pattern and the memory control circuit unit 404 disables the reset function to the embedded multimedia card 60 through the reset pin 700, the embedded multimedia card 60 enters a debug mode. Particularly, in this exemplary embodiment, the first pulse signal that instructs the embedded multimedia card 60 to enter the debug mode is sent from the second host system 62 to the reset pin 700. Thus, the memory control circuit unit 404 may further enable an access operation of the second host system 62 to the embedded multimedia card 60 through the reset pin 700, such that two-way data transmission between the second host system 62 and the embedded multimedia card 60 is enabled, and the user is consequently able to perform the debug analysis to the embedded multimedia card 60 through the second host system 62.

Figure 9A:
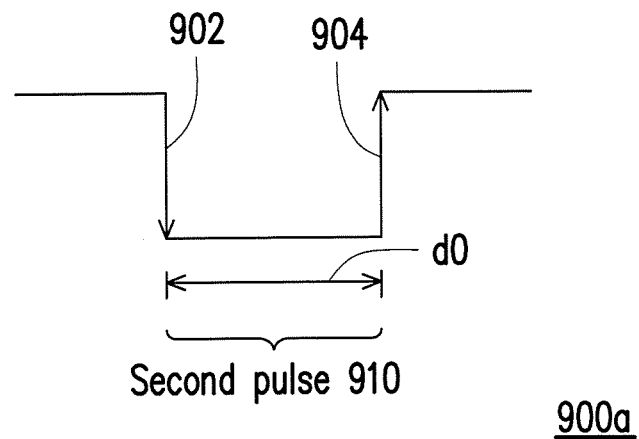
FIG. 9A is a schematic diagram illustrating a reset signal according to an exemplary embodiment of the present invention.
Figure 9B:
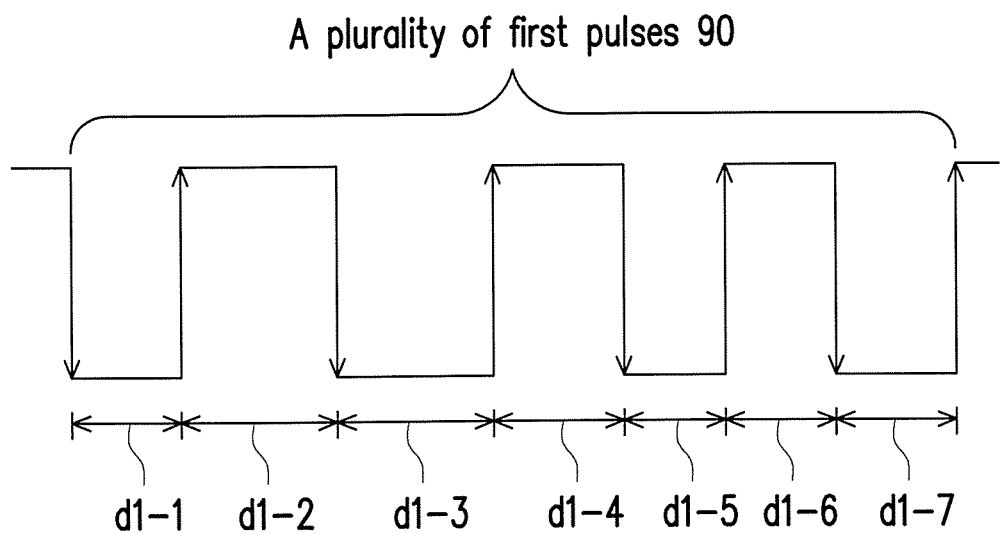
FIG. 9B is a schematic diagram illustrating a pulse signal having a predetermined serial pulse pattern according to an exemplary embodiment of the present invention.

FIG. 9A is a schematic diagram illustrating a reset signal according to an exemplary embodiment of the present invention. FIG. 9B is a schematic diagram illustrating a pulse signal having a predetermined serial pulse pattern according to an exemplary embodiment of the present invention.

In this exemplary embodiment, a hardware reset mechanism of the embedded multimedia card 60 is triggered if the first host system 61 outputs the second pulse signal to the reset pin 700 of the embedded multimedia card 60. More specifically, a pulse is formed of a dropping edge, a rising edge, and a pulse width between the dropping edge and the rising edge. As shown in FIG. 9A, a serial pulse pattern of a second pulse signal 900a includes at least one pulse 910 (also referred to as second pulse 910), and the second pulse 910 includes a dropping edge 902 and a rising edge 904. For example, in an exemplary embodiment, a hardware reset mechanism of the embedded multimedia card 60 is implemented by having the first host system 61 output the second pulse signal 900a with a low pulse lasting 1 µs or more to the reset pin 700 of the embedded multimedia card 60. Accordingly, the rising edge of the second pulse signal 900a may trigger the reset pin 700, such that the memory control circuit unit 404 performs the hardware reset operation to the embedded multimedia card 60. In other words, the second pulse signal 900a is a pulse signal having a low pulse with a pulse width d0 greater than or equal to 1 µs. However, the present invention does not intend to limit the pulse pattern corresponding to the pulse signal of the reset signal. For example, in another exemplary embodiment, the second pulse signal 900a may also be a pulse signal having a high pulse with a pulse width greater than or equal to 1 µs, and the dropping edge of the second pulse signal 900a may trigger the reset pin 700, such that the memory control circuit unit 404 performs the hardware reset operation.

Referring to FIG. 9B, FIG. 9B illustrates a pulse signal 900b having the first predetermined serial pulse pattern. The second pulse signal 900a for triggering the memory control circuit unit 404 to perform the hardware reset operation is received by the reset pin 700, and the first pulse signal for triggering the memory control circuit unit 404 to control the embedded multimedia card 60 to enter the debug mode is also received by the reset pin 700. Thus, in this exemplary embodiment, each of a plurality of pulse widths d1-1 to d1-7 of a plurality of pulses (also referred to as a plurality of first pulses 920) is set to be less than the pulse width d0 of the second pulse signal 900a for triggering the hardware reset operation, so as to form the first predetermined serial pulse pattern. For example, each of the pulse widths d1-1 to d1-7 is less than 0.5 µs. In this way, the reset signal detecting circuit 720 may be prevented from detecting the pulse signal having the same pulse width as the reset signal from the reset pin 700 that triggers the hardware reset operation if the first serial pulse pattern of the first pulse signal is conformed to the first predetermined serial pulse pattern. However, the present invention is not limited thereto. For example, in another exemplary embodiment above, the pulse pattern detecting circuit 710 may temporarily disable the operation of the reset signal detecting circuit 720 after the reset pin 700 receives a pulse signal from the second host system and then determine whether the pulse pattern of the received pulse signal is conformed to the first predetermined serial pulse pattern. Accordingly, the reset signal detecting circuit 720 may be prevented from receiving the reset signal from the first host system 60. Also, the pulse signal 900b is merely an exemplary pulse signal and does not serve to limit the present invention.

Figure 10:
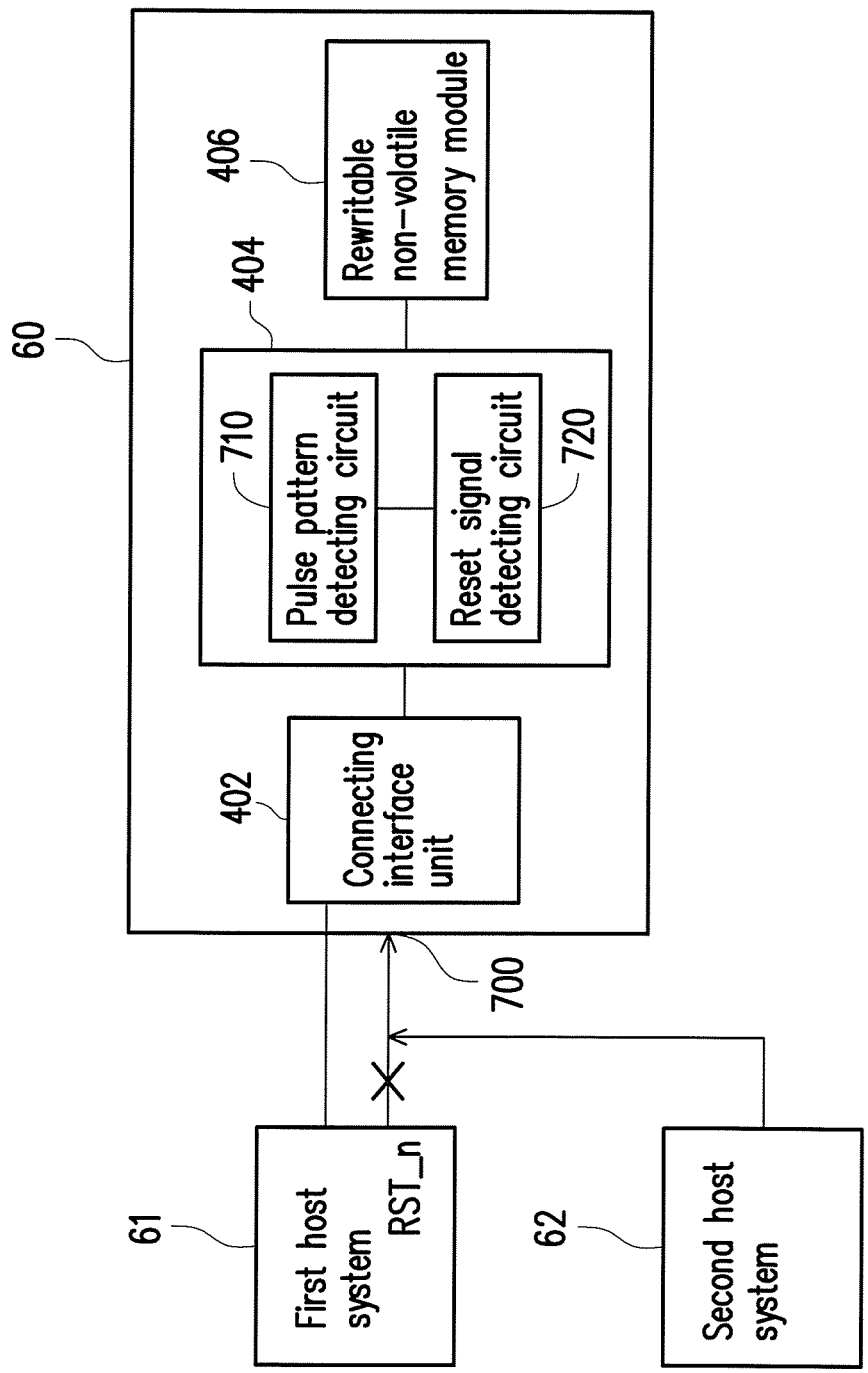
FIG. 10 is a schematic diagram illustrating a connection path between a reset pin and a host system according to an exemplary embodiment of the present invention.

FIG. 10 is a schematic diagram illustrating a connection path between a reset pin and a host system according to an exemplary embodiment of the present invention.

Referring to FIG. 10, in particular, if the second host system 62 is used to perform an access operation to the embedded multimedia card 60, to avoid the interference from of an output signal from the first host system 61 received by the reset pin 700, the memory control circuit 404 may disable the operation of the reset signal detecting circuit 720 in this exemplary embodiment, such that only a connection path between the reset pin 700 and the second host system 62 is turned on. As shown in FIG. 10, a connection path between the first host system 61 and the reset pin 700 is turned off, while the connection path between the second host system 62 and the reset pin 700 is turned on.

Figure 11:
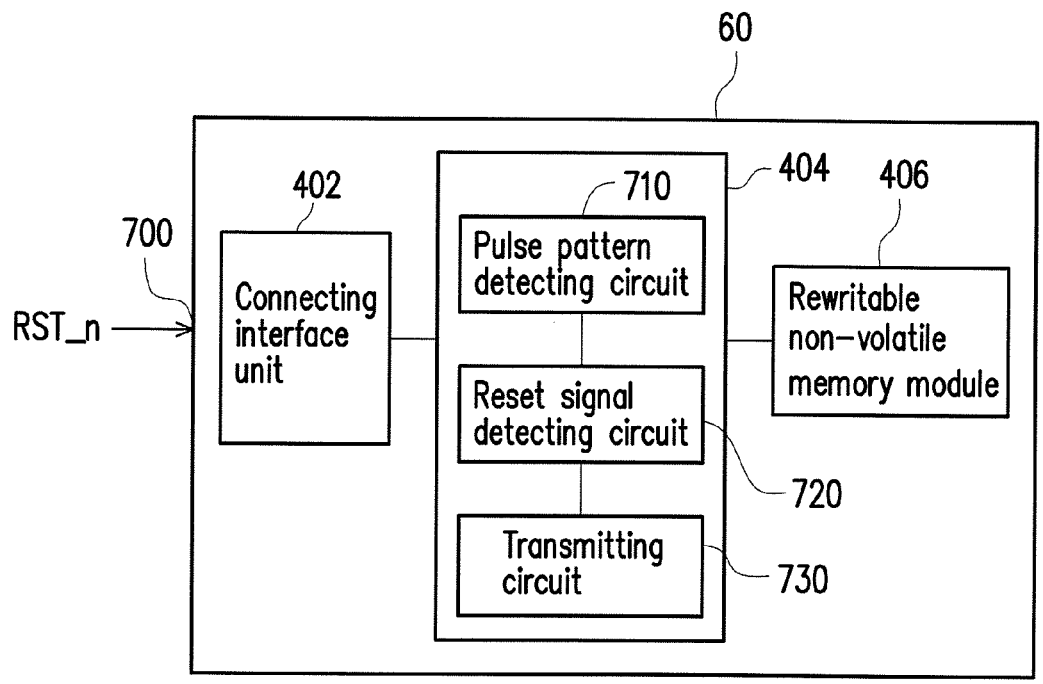
FIG. 11 is an exemplary schematic diagram illustrating operation of a memory control circuit unit according to another exemplary embodiment of the present invention.
Figure 12:
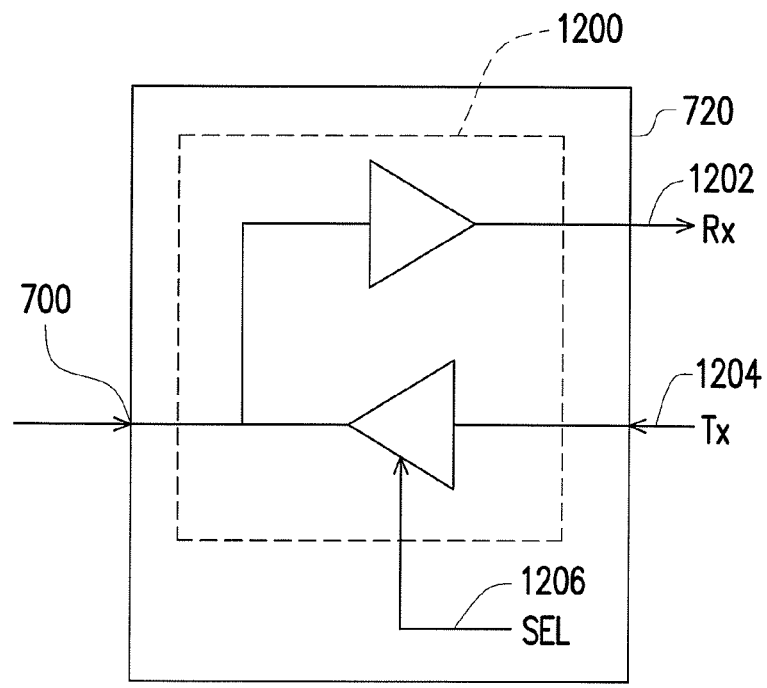
FIG. 12 illustrates a transmitting circuit according to an exemplary embodiment of the present invention.

FIG. 11 is an exemplary schematic diagram illustrating operation of a memory control circuit unit according to another exemplary embodiment of the present invention. FIG. 12 illustrates a transmitting circuit according to an exemplary embodiment of the present invention.

Referring to FIGS. 11 and 12, in another exemplary embodiment of the present invention, the memory control circuit unit 404 further includes a transmitting circuit 730 coupled to the reset pin 700. The transmitting circuit 730 includes a switch 1200, a receiving end 1202, and a transmitting end 1204. In addition, the switch 1200 is coupled to the reset pin 700, the receiving end 1202, and the transmitting end 1204. Furthermore, the switch 1200 is controlled by a selection signal 1206 to turn on a path between the reset pin 700 and the receiving end 1202 or a path between the reset pin 700 and the transmitting end 1204. It should be noted that the present invention does not intend to limit the source of the selection signal 1206. For example, the selection signal 1206 may be generated by the memory control circuit unit 404. Similarly, the pulse pattern detecting circuit 710 determines whether the first serial pulse pattern of the received first pulse signal is conformed to the first predetermined serial pulse pattern. For example, if the first serial pulse pattern is conformed to the first predetermined serial pulse pattern, the memory control circuit unit 404 turns on a function of the transmitting circuit 730. Particularly, the switch 1200 is controlled by the selection signal 1206, such that the reset pin 700 and the receiving end 1202 of the transmitting circuit 730 are turned on. Accordingly, the receiving end 1202 may receive an access command (also referred to as first command) from the second host system 62 to enable the access operation of the second host system 62 to the embedded multimedia card 60 through the pin 700. Also, after the receiving end 1202 receives the first command from the second host system 62, the switch 1200 may, based on the selection signal 1206, change ON/OFF states of the respective paths between the reset pin 700 and the receiving end 1202, and between the reset pin 700 and the transmitting end 1204 by turning on the path between the reset pin 700 and the transmitting end 1204 and turning off the path between the reset pin 700 and the receiving end 1202. Accordingly, a response message corresponding to the first command may be transmitted to the second host system 62 through the transmitting end 1204. In addition, after the transmitting end 1204 transmits the response message corresponding to the first command to the second host system 62, the switch 1200 may, based on the selection signal 1206, turn on the path between the reset pin 700 and the receiving end 1202 and turn off the turned-on path between the reset pin 700 and the transmitting end 1204.

In other words, under most circumstances in the debug mode, the reset pin 700 and the receiving end 1202 are turned on to continuously receive the commands and data from the second host system 62, and the path between the reset pin 700 and the transmitting end 1204 is turned on by the switch 1200 only if the transmitting circuit 730 transmits the response message corresponding to the command and data from the second host system 62 to the second host system 62. After the transmitting end 1204 transmits the response message corresponding to the command and data from the second host system 62 to the second host system 62, the path between the reset pin 700 and the receiving end 1202 is immediately turned on by the switch 1202 to continue to receive the command and data from the second host system 62. Thus, the two-way data transmission between the second host system 62 and the embedded multimedia card 60 through the reset pin 700 is achieved, and operations such as debug analysis, parameter setting, or firmware code updating, etc., may be performed to the embedded multimedia card 60. Particularly, in this exemplary embodiment, the data transmission between an external host system and the embedded storage device is made through the readily available reset pin 700 of the embedded storage device. Thus, it does not require to design a specific pin for debugging in advance for a specific electronic device.

Figure 13:
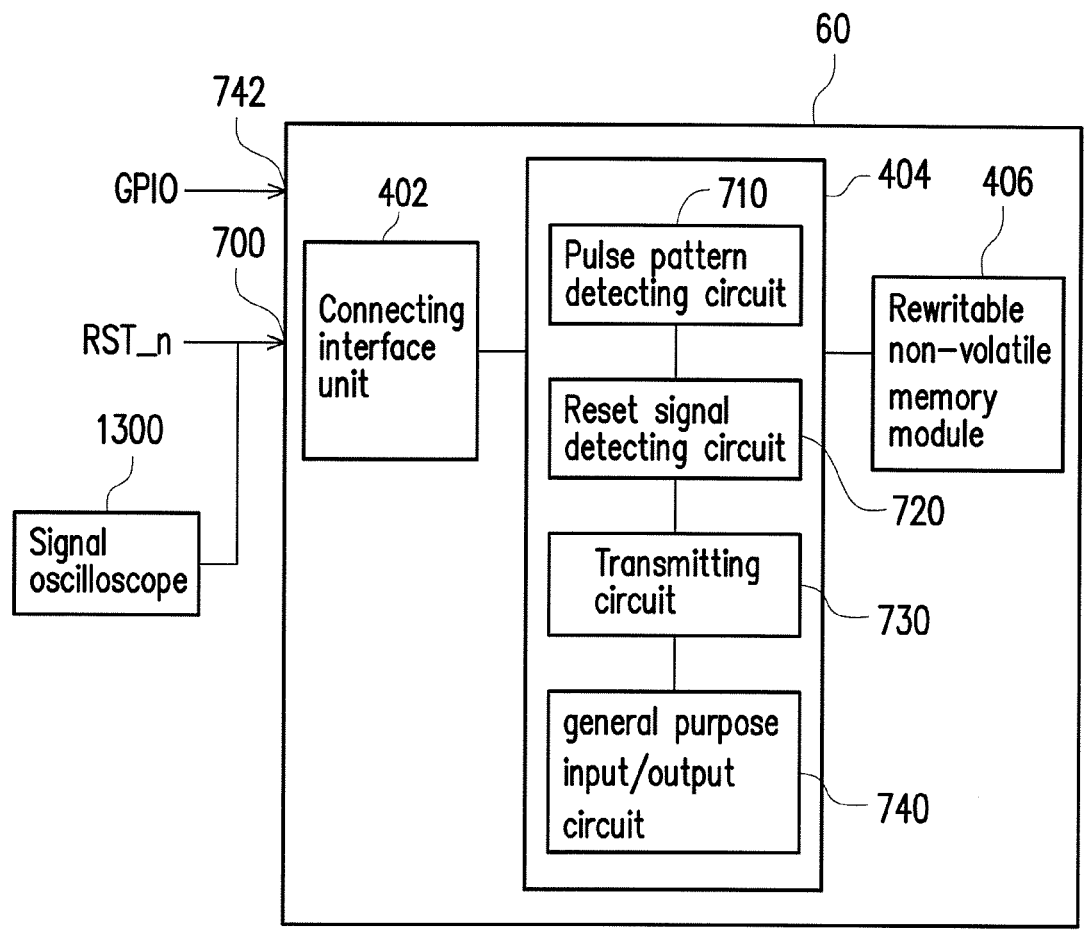
FIG. 13 is an exemplary schematic diagram illustrating operation of a memory control circuit unit according to another exemplary embodiment of the present invention.
Figure 14:
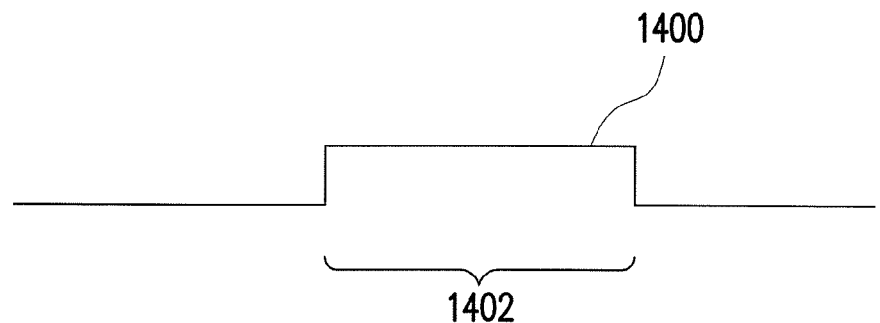
FIG. 14 is a schematic diagram illustrating a pulse signal output by a general purpose input/output circuit having a high level voltage according to an exemplary embodiment of the present invention.

FIG. 13 is an exemplary schematic diagram illustrating operation of a memory control circuit unit according to another exemplary embodiment of the present invention. FIG. 14 is a schematic diagram illustrating a pulse signal output by a general purpose input/output circuit having a high level voltage according to an exemplary embodiment of the present invention.

Referring to FIGS. 13 and 14, in another exemplary embodiment of the present invention, the memory control circuit unit 404 further includes a general purpose input/output circuit 740 coupled to the reset pin 700. In addition, the embedded multimedia card 60 further includes a general purpose input/output pin 742. The general purpose input/output pin 742 is coupled to the memory control circuit unit 404 and the general purpose input/output circuit 740. The memory control circuit unit 404 outputs a pulse signal (also referred to as third pulse signal) to a signal oscilloscope 1300 of the reset pin 700 through the general purpose input/output circuit 740, such that the signal oscilloscope 1300 may capture an operation signal of the embedded multimedia card 60 at a specific time point based on the third pulse signal. For example, in the debug mode, the reset pin 700 and the receiving end 1202 of the transmitting circuit 730 are in the ON state to continuously receive the commands and data from the second host system 62. Thus, if the second host system 62 updates firmware codes to the embedded multimedia card 60 to capture a signal waveform corresponding to a time point if the embedded multimedia card 60 is expected to have an anomaly by using the signal oscilloscope 1300, the receiving end 1202 of the transmitting circuit 730 receives the firmware codes from the second host system 62. For example, the firmware codes include a debug command (also referred to as second command), and the second command instructs to set a voltage level of the general purpose input/output circuit 740 at a high-level voltage at the time point of the expected anomaly.

Then, the ON/OFF states of the paths between the reset pin 700 and the receiving end 1202 of the transmitting circuit 730 and between the reset pin 700 and the transmitting end 1204 of the transmitting circuit 730 are changed by turning on the path between the reset pin 700 and the transmitting end 1204 of the transmitting circuit 730 and turning off the path between the reset pin 700 and the receiving end 1202 of the transmitting circuit 730. Accordingly, after the memory control circuit unit 404 completes the firmware code update operation of the embedded multimedia card 60, a debug message corresponding to the second command in response to a firmware code update outcome may be sent to the second host system 62 through the transmitting end 1204. At this time, the memory control circuit unit 404 may turn on a function of the general purpose input/output circuit 740.

Particularly, after the memory control circuit unit 404 turns on the function of the general purpose input/output circuit 740, the memory control circuit unit 404 may set the voltage level of the general purpose input/output circuit 740 at a high level voltage at a specific time point (e.g., the time point of the expected anomaly) based on the second command. Then, the memory control circuit unit 404 may transmit the third pulse signal corresponding to the high level voltage to the signal oscilloscope 1300 connected to the reset pin 700 through the general purpose input/output circuit 740. As shown in FIG. 14, the memory control circuit unit 404 may transmit a third pulse signal 1400 having a high pulse for a period of time (e.g., 10 μs) from the general purpose input/output circuit 740 to the signal oscilloscope 1300 connected to the reset pin 700. In other words, the signal oscilloscope 1300 captures the operation signal of the embedded multimedia card 60 based on a detected pulse 1402 having a high level voltage, and the signal oscilloscope 1300 detects the pulse 1402 having a high level voltage and captures the signal of the operation in the embedded multimedia card 60 at the same time if the embedded multimedia card 60 has an expected anomaly. It should be noted that, after the memory control circuit unit 404 transmits the third pulse signal corresponding to the high level voltage to the signal oscilloscope 1300 connected to the reset pin 700 through the general purpose input/output circuit 740, the memory control circuit unit 404 may switch a currently executing function from the function of the general purpose input/output circuit to the function of the transmitting circuit 730, and the path between the reset pin 700 and the receiving end 1202 is immediately turned on by the memory control circuit unit 404 by using the switch 1200, so as to continuously receive the commands and data from the second host system 62.

In this exemplary embodiment, in the debug mode of the embedded multimedia card 60, the reset pin 700 and the receiving end 1202 of the transmitting circuit 730 are in the ON state to continuously receive the commands and data from the second host system 62. Accordingly, if the debug mode is disabled to stop the access operation of the second host system 62 to the embedded multimedia card 60 through the reset pin 700, a command (also referred to as third command) for disabling the debug mode may be transmitted from the second host system 62 to the receiving end 1202 of the transmitting circuit 730 through the reset pin 700. Specifically, after the receiving end 1202 of the transmitting circuit 730 receives the third command for disabling the debug mode from the second host system 62, the memory control circuit unit 404 disables the access operation of the second host system 62 to the embedded multimedia card 60 through the reset pin 700. For example, the memory control circuit unit 404 may switch the currently executing function from the function of the transmitting circuit 730 to the function of the pulse pattern detecting circuit 710 and the reset signal detecting circuit 720. However, the present invention is not limited thereto. For example, in another exemplary embodiment, the debug mode may also be disabled if the pulse pattern detecting circuit 710 detects a pulse signal (also referred to as fourth pulse signal) for disabling the debug mode. Specifically, the pulse pattern detecting circuit 710 may determine whether a serial pulse pattern (also referred to as third serial pulse pattern) of the fourth pulse signal is conformed to a predetermined serial pulse pattern (also referred to as second predetermined serial pulse pattern), and the second predetermined serial pulse pattern is different from the first predetermined serial pulse pattern. Similarly, if the third serial pulse pattern is conformed to the second predetermined serial pulse pattern, the memory control circuit unit 404 disables the access operation performed by the second host system 62 to the embedded multimedia card 60 through the reset pin 700.

It should be noted that, in the exemplary embodiment of the present invention, after the pulse pattern detecting circuit 710 determines that the first serial pulse pattern of the first pulse signal is conformed to the first predetermined serial pulse pattern, the memory control circuit unit 404 may further write data corresponding to the debug mode to a specific physical erasing unit of the rewritable non-volatile memory module 406. Thus, if the first host system 61 is turned off or rebooted, making the embedded multimedia card 60 restarted, the memory control circuit 404 reads the data of the specific physical erasing unit and determines whether the specific physical erasing unit stores the data corresponding to the debug mode. If the specific physical erasing unit stores the data corresponding to the debug mode, the memory control circuit unit 404 enables the access operation of the second host system 62 to the embedded multimedia card 60 through the reset pin 700, such that the embedded multimedia card 60 enters the debug mode, and the embedded multimedia card 60 exits the debug mode and erases the data corresponding to the debug mode stored in the specific physical erasing unit until the memory control circuit unit 404 receives the third command or the fourth pulse signal for disabling the debug mode from the second host system 62. Alternatively, if the embedded multimedia card 60 is restarted and the specific physical erasing unit does not store the data corresponding to the debug mode, the embedded multimedia card 60 does not enter the debug mode until the first serial pulse pattern conformed to the first predetermined serial pulse pattern is received. However, the present invention is not limited thereto. For example, in another exemplary embodiment, the memory control circuit unit 404 does not write the data corresponding to the debug mode to the specific physical erasing unit of the rewritable non-volatile memory module 406. Thus, if the first host system 61 is turned off or rebooted, making the embedded multimedia card restarted, the memory control circuit unit 404 controls the embedded multimedia card 60 to enter the debug mode based on the pulse signal received in each time that is conformed to the first predetermined serial pulse signal and controls the embedded multimedia card 60 to exit the debug mode based on the received command or fourth pulse signal for disabling the debug mode.

Figure 15:
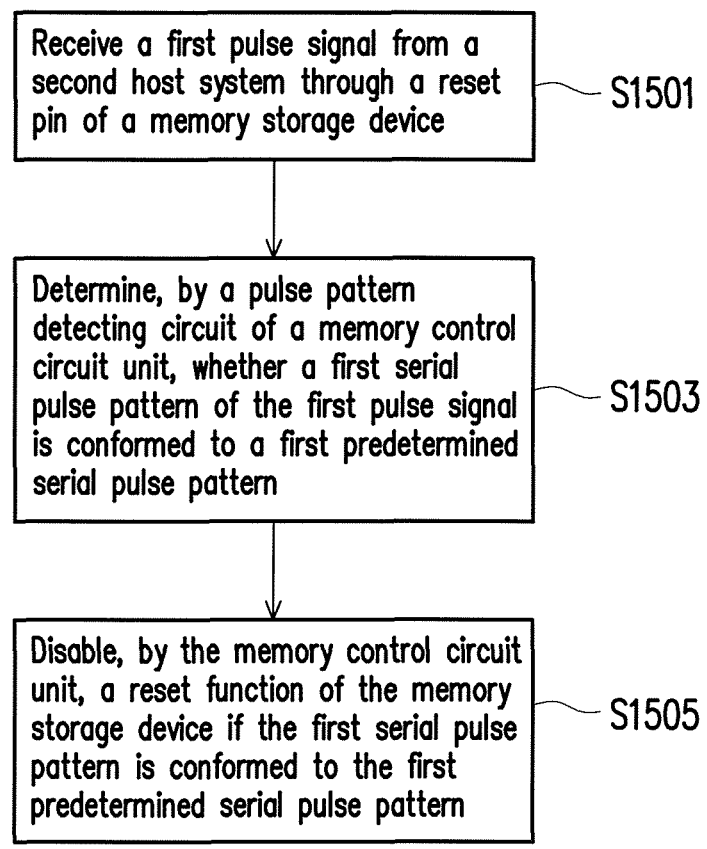
FIG. 15 is a flowchart illustrating a data transmitting method according to an exemplary embodiment of the present invention.

FIG. 15 is a flowchart illustrating a data transmitting method according to an exemplary embodiment of the present invention.

Referring to FIG. 15, at Step S1501, the reset pin of the memory storage device 10 receives the first pulse signal from the second host system 62. At Step S1503, the pulse pattern detecting circuit 710 of the memory control circuit unit 404 determines whether the first serial pulse pattern of the first pulse signal is conformed to the first predetermined serial pulse pattern. At Step S1505, if the first serial pulse pattern is conformed to the first predetermined serial pulse pattern, the memory control circuit unit 404 disables the reset function of the memory storage device 10.

Details with respect to the above steps are already described in the foregoing, and thus not repeated in the following. It should be noted that the respective steps of FIG. 15 may be implemented as a plurality of programming codes or circuits, and the present invention does not intend to impose a limitation in this regard. Also, the method shown in FIG. 15 may be used in the above exemplary embodiments or used solely. The present invention does not intend to impose a limitation in this regard.

In view of the foregoing, in the memory control circuit unit, the memory storage device, and the data transmitting method according to the exemplary embodiments of the present invention, the reset function of the embedded storage device is disabled and the access operation to the embedded storage device through the reset pin is enabled by using the pulse signal having the predetermined serial pulse signal pattern. Accordingly, the two-way communication of information is realized with the single reset pin. Thus, the embedded storage device soldered to the electronic device may be restored to its original state without being desoldered, and the issue that results in the anomaly of the electronic device having the embedded storage device may be correctly determined and solved. Moreover, in the memory control circuit unit, the memory storage device, and the data transmitting method according to the exemplary embodiments of the present invention, the updated firmware codes may be transmitted through the reset pin, such that the oscilloscope is able to capture the operation signal of the embedded storage device at a specific time point. Accordingly a debug efficiency of the electronic device having the embedded storage device is able to be improved.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A memory control circuit unit for controlling a memory storage device, the memory control circuit unit comprising:
   a host interface, coupled to a first host system;
   a memory interface, coupled to a rewritable non-volatile memory module;
   a memory management circuit, coupled to the host interface and the memory interface; and
   a pulse pattern detecting circuit, coupled to the host interface and the memory management circuit,
   wherein the memory storage device comprises a reset pin coupled to the memory control circuit unit and the pulse pattern detecting circuit, so as to receive a first pulse signal from a second host system,
   wherein the pulse pattern detecting circuit is configured to determine whether a first serial pulse pattern of the first pulse signal is conformed to a first predetermined serial pulse pattern,
   wherein if the first serial pulse pattern is conformed to the first predetermined pulse pattern, the memory management circuit is further configured to disable a reset function of the memory storage device.

2. The memory control circuit unit as claimed in claim 1, further comprising a reset signal detecting circuit coupled to the reset pin, wherein the reset function is triggered if the reset signal detecting circuit detects a second pulse signal received by the reset pin, and the second pulse signal is from the first host system,
   wherein after the reset pin receives the first pulse signal from the second host system, the memory management circuit is further configured to temporarily disable operation of the reset signal detecting circuit and then determines whether the first serial pulse pattern of the first pulse signal is conformed to the first predetermined serial pulse pattern.

3. The memory control circuit unit as claimed in claim 1, further comprising a reset signal detecting circuit coupled to the reset pin, wherein the reset function is triggered if the reset signal detecting circuit detects a second pulse signal received by the reset pin, and the second pulse signal is from the first host system,
   wherein in the operation of disabling the reset function of the memory storage device, the memory management circuit disables the reset signal detecting circuit and turns on a connection path between the reset pin and the second host system,
   wherein the first predetermined serial pulse pattern comprises a plurality of first pulses, a second serial pulse pattern of the second pulse signal comprises at least one second pulse, and a pulse width of each of the first pulses is smaller than a pulse width of the second pulse.

4. The memory control circuit unit as claimed in claim 3, wherein the memory management circuit is further configured to enable an access operation of the second host system to the memory storage device through the reset pin after disabling the reset function of the memory storage device.

5. The memory control circuit unit as claimed in claim 4, further comprising a transmitting circuit coupled to the reset pin,
   wherein the transmitting circuit comprises a switch, a receiving end, and a transmitting end, the switch is coupled to the reset pin, the receiving end, and the transmitting end, and the switch is controlled by a selection signal to turn on a path between the reset pin and the receiving end or a path between the reset pin and the transmitting end,
   wherein in the operation of enabling the access operation of the second host system to the memory storage device through the reset pin, the memory management circuit is further configured to turn on the path between the reset pin and the receiving end by using the switch, and after the receiving end receives a first command from the second host system, the memory management circuit is further configured to turn on the path between the reset pin and the transmitting end by using the switch,
   wherein after the transmitting end transmits a response message corresponding to the first command to the second host system, the memory management circuit is further configured to turn on the path between the reset pin and the receiving end by using the switch.

6. The memory control circuit unit as claimed in claim 5, further comprising a general purpose input/output circuit coupled to the reset pin,
   wherein the memory storage device further comprises a general purpose input/output pin coupled to the memory control circuit unit and the general purpose input/output circuit,
   wherein the receiving end of the transmitting circuit is configured to receive a second command from the second host system, and the second command instructs the general purpose input/output circuit to set a voltage level at a high level voltage at a specific time point,
   wherein the reset pin is further coupled to a signal oscilloscope, and the signal oscilloscope receives a third pulse signal corresponding to the high level voltage from the general purpose input/output circuit through the reset pin.

7. The memory control circuit unit as claimed in claim 5, wherein the receiving end of the transmitting circuit is further configured to receive a third command from the second host system, and the memory management circuit is configured to disable the access operation of the second host system to the memory storage device through the reset pin based on the third command.

8. A memory storage device, comprising:
   a connecting interface unit, coupled to a first host system;
   a rewritable non-volatile memory module, comprising a plurality of physical erasing units;
   a memory control circuit unit, coupled to the connecting interface unit and the rewritable non-volatile memory module; and
   a reset pin, coupled to the connecting interface unit and the memory control circuit unit to receive a first pulse signal from a second host system;
   wherein the memory control circuit unit comprises:
   a pulse pattern detecting circuit, coupled to the reset pin,
   wherein the pulse pattern detecting circuit is configured to determine whether a first serial pulse pattern of the first pulse signal is conformed to a first predetermined serial pulse pattern;
   wherein if the first serial pulse pattern is conformed to the first predetermined pulse pattern, the memory control circuit unit is further configured to disable a reset function of the memory storage device.

9. The memory storage device as claimed in claim 8, wherein the memory control circuit unit further comprises:
a reset signal detecting circuit, coupled to the reset pin, wherein the reset function is triggered if the reset signal detecting circuit detects a second pulse signal received by the reset pin, and the second pulse signal is from the first host system,
wherein after the reset pin receives the first pulse signal from the second host system, the memory control circuit unit is further configured to temporarily disable operation of the reset signal detecting circuit and then determines whether the first serial pulse pattern of the first pulse signal is conformed to the first predetermined serial pulse pattern.

10. The memory storage device as claimed in claim 8, wherein the memory control circuit unit further comprises:
a reset signal detecting circuit, coupled to the reset pin, wherein the reset function is triggered if the reset signal detecting circuit detects a second pulse signal received by the reset pin, and the second pulse signal is from the first host system,
wherein in the operation of disabling the reset function of the memory storage device, the memory control circuit unit disables the reset signal detecting circuit and turns on a connection path between the reset pin and the second host system,
wherein the first predetermined serial pulse pattern comprises a plurality of first pulses, a second serial pulse pattern of the second pulse signal comprises at least one second pulse, and a pulse width of each of the first pulses is smaller than a pulse width of the second pulse.

11. The memory storage device as claimed in claim 10, wherein the memory control circuit unit is further configured to enable an access operation of the second host system to the memory storage device through the reset pin after disabling the reset function of the memory storage device.

12. The memory storage device as claimed in claim 11, wherein the memory control circuit unit further comprises:
a transmitting circuit, coupled to the reset pin,
wherein the transmitting circuit comprises a switch, a receiving end, and a transmitting end, the switch is coupled to the reset pin, the receiving end, and the transmitting end, and the switch is controlled by a selection signal to turn on a path between the reset pin and the receiving end or a path between the reset pin and the transmitting end,
wherein in the operation of enabling the access operation of the second host system to the memory storage device through the reset pin, the memory control circuit unit is further configured to turn on the path between the reset pin and the receiving end by using the switch, and after the receiving end receives a first command from the second host system, the memory control circuit unit is further configured to turn on the path between the reset pin and the transmitting end by using the switch,
wherein after the transmitting end transmits a response message corresponding to the first command to the second host system, the memory control circuit unit is further configured to turn on the path between the reset pin and the receiving end by using the switch.

13. The memory storage device as claimed in claim 12, further comprising:
a general purpose input/output pin, coupled to the memory control circuit unit,
wherein the memory control circuit unit further comprises a general purpose input/output circuit coupled to the reset pin and the general purpose input/output pin,
wherein the receiving end of the transmitting circuit is configured to receive a second command from the second host system, and the second command instructs the general purpose input/output circuit to set a voltage level at a high level voltage at a specific time point,
wherein the reset pin is connected to a signal oscilloscope, and the signal oscilloscope receives a third pulse signal corresponding to the high level voltage from the general purpose input/output circuit through the reset pin.

14. The memory storage device as claimed in claim 12, wherein the receiving end of the transmitting circuit is further configured to receive a third command from the second host system, and the memory control circuit unit is further configured to disable the access operation of the second host system to the memory storage device through the reset pin based on the third command.

15. A data transmitting method for a memory storage device, wherein the memory storage device is coupled to a first host system, the data transmitting method comprising:
receiving a first pulse signal from a second host system through a reset pin of the memory storage device;
determining, by a pulse pattern detecting circuit of the memory storage device, whether a first serial pulse pattern of the first pulse signal is conformed to a first predetermined serial pulse pattern; and
disabling a reset function of the memory storage device if the first serial pulse pattern is conformed to the first predetermined serial pulse pattern.

16. The data transmitting method as claimed in claim 15, wherein the reset function is triggered if a reset signal detecting circuit of the memory storage device detects a second pulse signal received by the reset pin, and the second pulse signal is from the first host system, the data transmitting method further comprising:
temporarily disabling operation of the reset signal detecting circuit after the reset pin receives the first pulse signal from the second host system and then determining whether the first serial pulse pattern of the first pulse signal is conformed to the first predetermined serial pulse pattern.

17. The data transmitting method as claimed in claim 15, wherein the reset function is triggered if a reset signal detecting circuit of the memory storage device detects a second pulse signal received by the reset pin, and the second pulse signal is from the first host system,
wherein the step of disabling the reset function of the memory storage device comprises:
disabling the reset signal detecting circuit, wherein a connection path between the reset pin and the second host system is turned-on,
wherein the first predetermined serial pulse pattern comprises a plurality of first pulses, a second serial pulse pattern of the second pulse signal comprises at least one second pulse, and a pulse width of each of the first pulses is smaller than a pulse width of the second pulse.

18. The data transmitting method as claimed in claim 17, further comprising:
enabling an access operation of the second host system to the memory storage device through the reset pin after disabling the reset function of the memory storage device.

19. The data transmitting method as claimed in claim 18, wherein the memory storage device further comprises a transmitting circuit coupled to the reset pin, the transmitting circuit comprises a switch, a receiving end, and a transmitting end coupled to the reset pin, and the switch is controlled by a selection signal to turn on a path between the reset pin and the receiving end or a path between the reset pin and the transmitting end, wherein the step of enabling the access operation of the second host system to the memory storage device through the reset pin comprises:

turning on the path between the reset pin and the receiving end by using the switch, and turning on the path between the reset pin and the transmitting end by using the switch after the receiving end receives a first command from the second host system; and turning on the path between the reset pin and the receiving end by using the switch after the transmitting end transmits a response message corresponding to the first command to the second host system.

20. The data transmitting method as claimed in claim 19, wherein the memory storage device further comprises a general purpose input/output pin and a general purpose input/output circuit, the data transmitting method further comprising:

receiving, by the receiving end of the transmitting circuit, a second command from the second host system, wherein the second command instructs the general purpose input/output circuit to set a voltage level at a high level voltage at a specific time point; and transmitting a third pulse signal corresponding to the high level voltage to a signal oscilloscope connected to the reset pin through the general purpose input/output circuit, wherein the signal oscilloscope captures a signal of an operation of the memory storage device at the specific time point based on the third pulse signal.

21. The data transmitting method as claimed in claim 19, further comprising:

receiving, by the receiving end of the transmitting circuit, a third command from the second host system, and disabling the access operation of the second host system to the memory storage device through the reset pin based on the third command.

\* \* \* \* \*